United States Patent [19]

Bagdis et al.

[11] 4,307,952
[45] Dec. 29, 1981

[54] AUTO FOCUS CAMERA WITH ELECTRONIC LENS DISC PAWL RELEASE ARRANGEMENT

[75] Inventors: Judy Bagdis, Bradford; Bruce K. Johnson, Andover; Kenneth J. Launie, Stoneham; George D. Whiteside, Lexington, all of Mass.

[73] Assignee: Polaroid Corporation, Cambridge, Mass.

[21] Appl. No.: 156,044

[22] Filed: Jun. 3, 1980

[51] Int. Cl.³ .............................................. G03B 13/20
[52] U.S. Cl. .................................................. 354/197
[58] Field of Search .......................... 354/25, 195, 197; 352/140, 142

[56] References Cited

U.S. PATENT DOCUMENTS 4,040,072 8/1977 Johnson et al. .................... 354/173
4,148,574 4/1979 Johnson ............................. 354/195
4,167,316 9/1979 Johnson et al. .................... 354/197
4,199,244 4/1980 Shenk ................................. 354/195
4,199,246 4/1980 Muggli ............................... 354/195

Primary Examiner—L. T. Hix
Assistant Examiner—William B. Perkey

[57] ABSTRACT

An automatic focusing control apparatus focuses subjects in any one of a plurality of different camera-to-subject distance ranges by transmitting a sonar ranging signal and at the same time displacing an objective lens to move through a plurality of different focal positions corresponding respectively to the different camera-to-subject distance ranges, and thereafter detecting an echo signal from a subject and utilizing the detected echo signal to provide a specially timed control signal to ultimately stop the displacement of the objective lens at the appropriate focal position corresponding to the distance range in which the subject is located.

22 Claims, 9 Drawing Figures

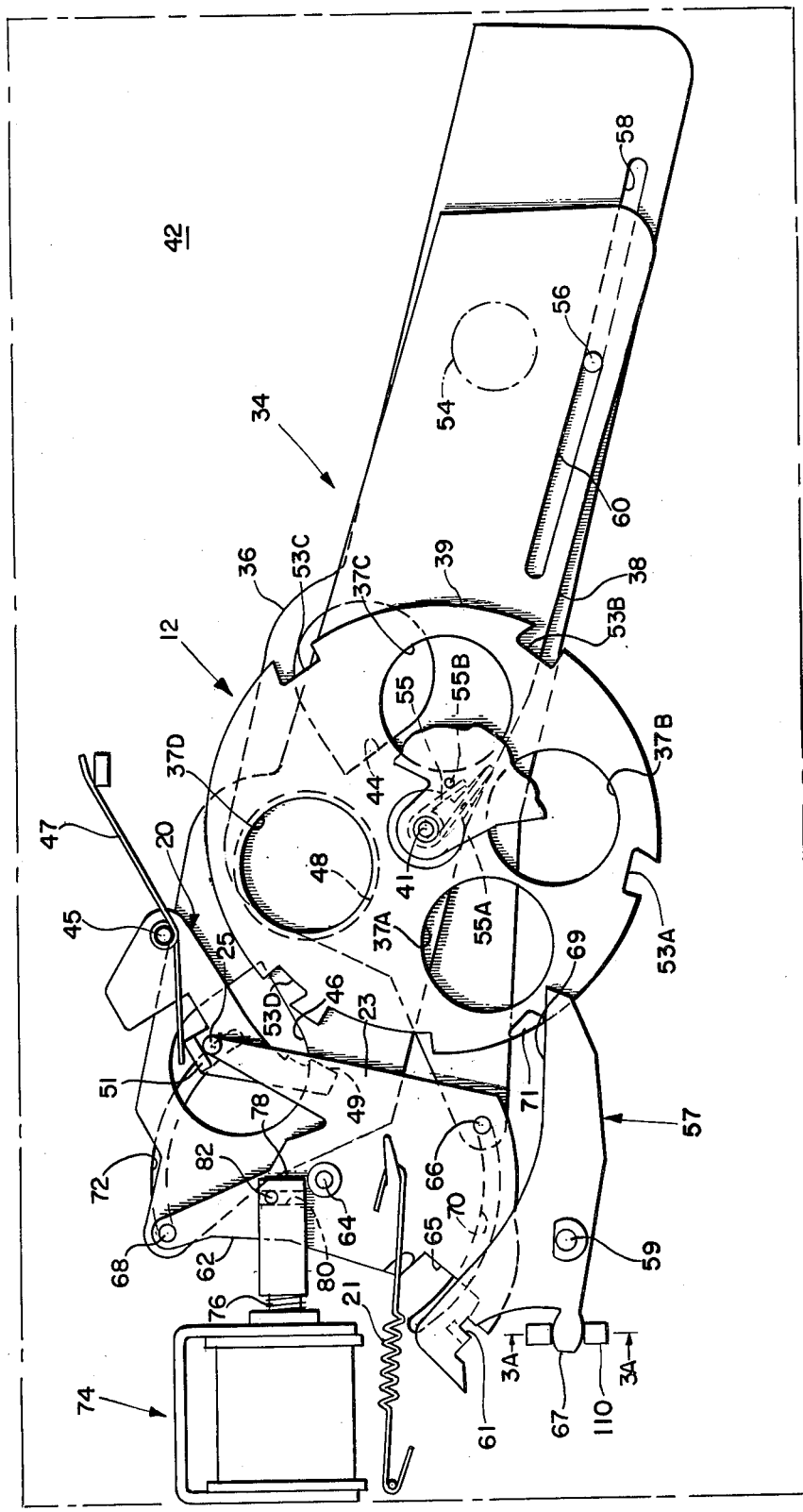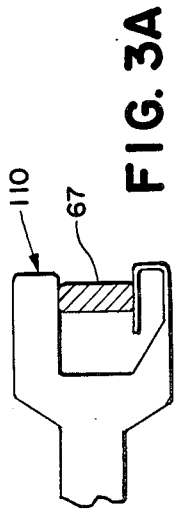
FIG. 3
FIG. 3A

AUTO FOCUS CAMERA WITH ELECTRONIC LENS DISC PAWL RELEASE ARRANGEMENT

BACKGROUND OF THE INVENTION

1. Field of the Invention

This invention relates generally to an automatic focusing apparatus and, more particularly, to an automatic focusing apparatus comprising both a sonar rangefinder and rotatable lens disc in which a specially timed control signal as determined by the rangefinder is utilized to stop the lens disc of the appropriate focal position.

2. Description of the Prior Art

Ultasonic ranging systems are well known for cameras, and in each of the systems ultrasonic energy is transmitted toward a subject to be photographed and the subject reflects the ultrasonic energy back to the camera. Characteristics of the transmitted and received signals may be compared to derive a control signal representative of the subject distance. The control signal can be thereafter used to drive the lens mount of the camera to a position corresponding to the subject distance whereby the subject will be in focus.

U.S. Pat. No. 4,199,246 entitled "Ultrasonic Ranging System For A Camera," by J. Muggli, issued in common assignment herewith, provides an ultrasonic ranging system for a camera having a lens mount movable to a position at which a subject being photographed is in focus. The system includes an ultrasonic transducer that responds to a keying pulse by transmitting a relatively short burst of frequency modulated ultrasonic energy and a synchronized receiver for processing an echo signal produced by the transducer upon receipt of an echo upon a predetermined time interval. The receiver produces a range signal with a characteristic related to the distance of a subject being photographed from the camera. The range signal representing the subject distance may thereafter be used in a manner as is more fully disclosed in U.S. Pat. No. 4,199,244 entitled "Automatic Focusing Camera," issued Apr. 22, 1980, in common assignment herewith to control a gated pulse generator in a nonlinear manner such that the latter produces a train of pulses whose number is representative of the actual position of the lens mount at which the subject will be in focus, and includes a focusing mechanism having means responsive to the pulse train produced by the pulse generator means for displacing the lens mount to the proper position. Such systems are complex and expensive since the range signal must be utilized to control a gated pulse in a nonlinear manner to produce a train of pulses whose number is representative of the actual position of a lens mount. The focusing mechanism must then embody a servo-mechanism to respond to the pulses produced by the pulse generator in order to mechanically displace the lens mount to the proper axial position thereby further contributing to the complex nature of such auto focus arrangements.

A simplified automatic sonar controlled focusing apparatus wherein the objective lens movement occurs in an elapsed time interval which is directly correlated to the elapsed time interval between which the sonar ranging signal is transmitted and thereafter received subsequent to being reflected by the photographic subject is more fully described in U.S. Pat. No. 4,167,316 entitled "Sonar Controlled Lens Focus Apparatus," by B. Johnson et al., issued Sept. 11, 1979, in common assignment herewith. The preferred objective lens arrangement comprises a plurality of lens elements mounted for displacement between a plurality of focal positions by a lens holding disc member disposed for rotation about a fixed center axis. The plurality of lens elements are disposed on the lens holding disc member in circumferentially spaced-apart relation with respect to each other about the center axis. Exposure control is provided by a scanning shutter blade arrangement including a pivotally disposed walking beam for imparting counter-reciprocal sliding movement to the shutter blade elements. The walking beam is pivotally disposed to impact upon an actuator member which, in turn, operates by way of a torsion spring to impact upon the lens holding disc member and thereby rotate the lens holding member so as to sequentially move each of the lens elements into the focal position. The lens disc includes a plurality of spaced apart notches disposed in circumferentially spaced-apart relation about the periphery thereof and a lens pawl releasable upon receipt of the sonar ranging signal is provided to move into a respective one of the notches to stop the rotation of the lens disc at the appropriate focal position. If the lens pawl is released and coincidently strikes the outer periphery of the lens disc at the instant that a notch is rotating past, then the lens pawl may bounce off the notch and not stop the rotation of the lens disc at the desired focal position. In addition, the speed of rotation for the lens disc must also be closely correlated to the timing for transmission and receipt of the sonar ranging signals for subjects located at various distances within given distance ranges from the camera.

Therefore, it is a primary object of this invention to provide an automatic sonar controlled lens focusing apparatus with an electronic timing arrangement to allow the lens focus to change at a substantially slower rate than had heretofore been required in order to correlate the speed of the objective lens movement with the times for transmission and receipt of the sonar ranging signals.

It is also an object of this invention to provide an automatic sonar controlled lens focusing apparatus with a lens disc for holding a plurality of circumferentially spaced apart lens elements, a releasable lens pawl for engaging one of a plurality of notches circumferentially disposed about the periphery of the lens disc for stopping the lens disc at the appropriate focal position and means for timing the release of the lens pawl so as to engage the lens disc in the space between a pair of adjacent notches thereby avoiding the possibility of the lens pawl directly striking a notch so as to bounce off.

SUMMARY OF THE INVENTION

An automatic lens focusing apparatus for automatically focusing image forming rays at a camera focal plane comprises means for generating and transmitting a sonar engaging signal and for providing an indication upon detection of an echo signal reflected from a photographic subject at an elapsed time subsequent to the transmission of the sonar ranging signal. The lens focusing apparatus also comprises an objective lens arrangement and means for mounting the objective lens arrangement for displacement between a plurality of focal positions. The objective lens arrangement is adapted to focus an image of a subject located at a different distance from the objective lens arrangement within a given range of distances at the focal plane of the camera at each of its focal positions. Means for effecting the displacement of the objective lens arrangement are provided so that the objective lens arrangement reaches each one of its plurality of focal positions respectively at an elapsed time from its initial displacement greater than the elapsed time from transmission to receipt of an echo signal by the sonar ranging means in the event that a photographic subject is located from the objective lens arrangement by a distance within the given range of distances corresponding to that one focal position in which the objective lens arrangement would focus an image of the subject at the focal plane of the camera. Means respond to receipt of an echo signal from a subject by the sonar ranging means by stopping the displacement of the objective lens arrangement at the one focal position in which the objective lens arrangement would focus an image of the subject at the focal plane of the camera. The stopping means operate to stop the objective lens arrangement at an elapsed time subsequent to receipt of the echo corresponding to the difference in the elapsed time for the objective lens arrangement to reach its one focal position from its initial displacement and the elapsed time from transmission to receipt of the echo.

The objective lens mounting means further comprises a plurality of spaced apart catches corresponding respectively to the plurality of focal positions. The stopping means includes means for engaging a respective one of the catches to stop the displacement of the objective lens arrangement and timing means for releasing the catch engaging means to first engage the objective lens arrangement in the space between a pair of adjacent catches. The continued displacement of the objective lens arrangement thereafter operates to move a respective one of the catches into engagement with the catch engaging means to stop the displacement of the objective lens arrangement.

DESCRIPTION OF THE DRAWINGS

The novel features that are considered characteristic of the invention are set forth with particularity in the appended claims. The invention itself, however, both as to its organization and its method of operation, together with other objects and advantages thereof will be best understood from the following description of the illustrated embodiment when read in connection with the accompanying drawings wherein:

FIG. 3 is a front elevational view showing portions of the automatic lens focusing apparatus and shutter blade mechanism of FIG. 2 at a different position;

FIG. 3A is a cross-sectional view taken along the lines 3A—3A in FIG. 3;

DESCRIPTION OF THE PREFERRED EMBODIMENT

Figure 1:
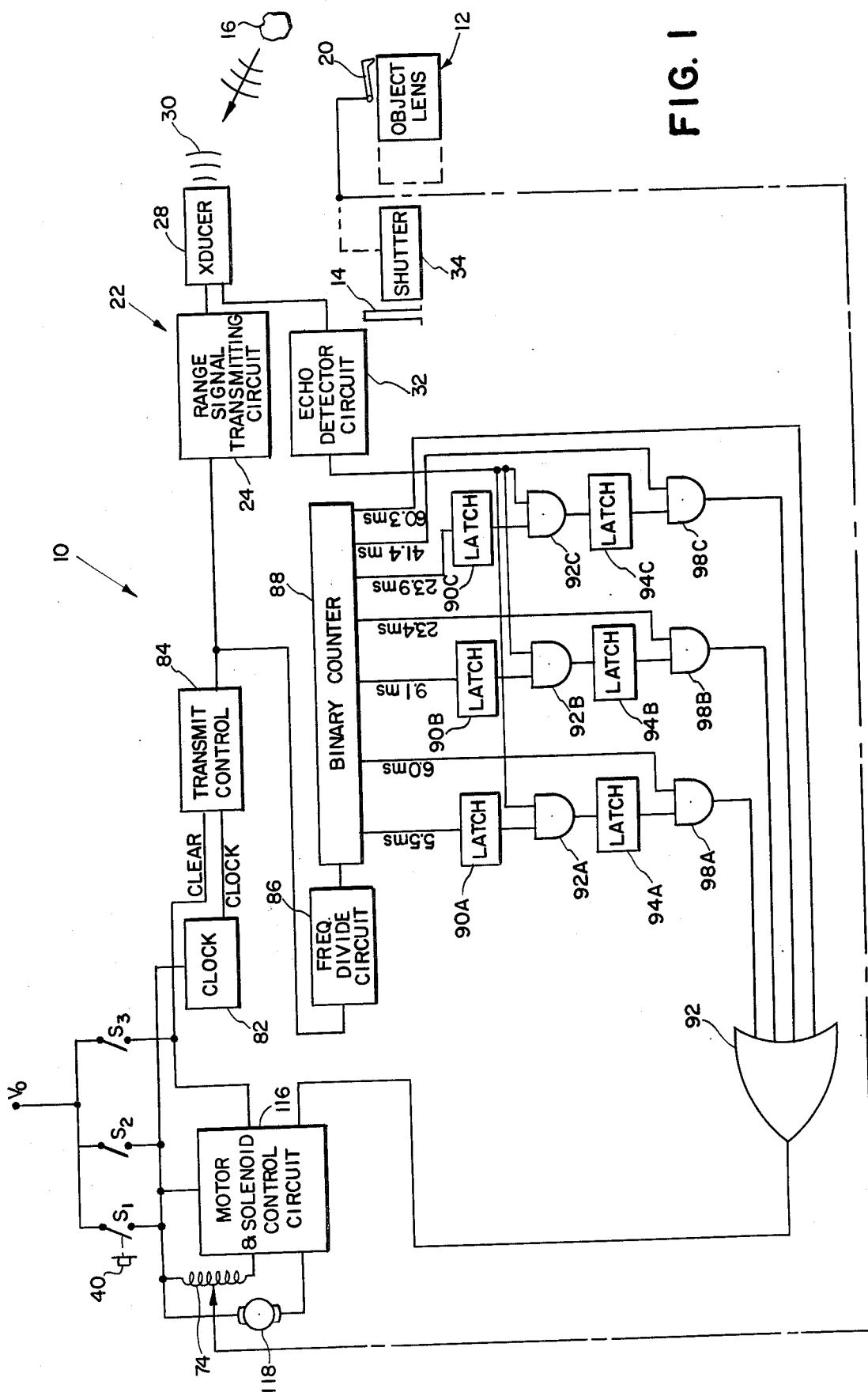
FIG. 1 is a block circuit diagram of a camera including the automatic lens focusing apparatus of this invention.

Referring now to FIG. 1, there is shown at 10 a simplified block diagram for a photographic camera apparatus embodying the automatic lens focusing arrangement of this invention. The camera apparatus 10 includes an objective lens arrangement or assembly, as shown in simplified fashion at 12, disposed for movement between a plurality of different focal positions which correspond respectively to different camera-to-subject distance ranges. During each film exposure operation, the objective lens assembly 12 is displaced to one of its focal positions for focusing at a focal plane 14, image forming light rays from a respective photographic subject as shown at 16 located within one of the distance ranges from the camera apparatus. As is readily apparent, the lens assembly 12 is adapted at each of its plurality of focal positions to focus at the focal plane 14 of the camera, an image of a photographic subject located at a different distance from the camera within the corresponding distance range.

The lens assembly 12 is preferably driven through its plurality of different focal positions in a manner to be subsequently described in greater detail herein and may be held at any one of its different focal positions by a lens stopping means comprising a releasable lens pawl 20 which will also be described in greater detail herein. The lens assembly 12 while in its initial terminal position operates to focus image-forming light rays from a photographic subject located at the closest possible distance range to the camera within the aforementioned camera-to-subject distance ranges and while in its other terminal position (phantom lines) operates to focus image-forming light rays from a photographic subject located at the furthest possible distance range from the camera within the aforementioned camera-to-subject distance ranges. The movement of the lens assembly 12 from its initial terminal position toward its other terminal position operates to progressively focus image-forming rays for corresponding subjects located at progressively increasing distance ranges from the camera.

The photographic apparatus 10 is also provided with a sonic rangefinder as shown generally at 22 and which is more fully disclosed in U.S. Pat. No. 4,199,246 entitled "Ultrasonic Ranging System For a Camera," by J. Muggli, issued Apr. 22, 1980, and U.S. Pat. No. 4,167,316 entitled "Sonar Controlled Lens Focus Apparatus," by B. Johnson et al., issued Sept. 11, 1979, in common assignment herewith and now incorporated by reference herein. The sonic rangefinder 22 includes a range signal transmitting circuit 24 which may be actuated in a manner to be herein described to issue a transmit commence signal to a sonic transducer 28 so as to cause the transmission of a sonar ranging signal comprising a burst of sonic energy as shown at 30. The transducer 28 thereafter operates to detect an echo signal reflected from the photographic subject 16 at an elapsed time interval subsequent to the transmission of the sonar ranging signal. An echo detector 32 then provides a signal indicative of this elapsed time period which corresponds directly to the distance between the camera and the subject 16 to be photographed. Thus, the sonic rangefinder 22 provides an indication of an elapsed time period which corresponds to the distance between the camera and the subject to be photographed for reasons which will become more apparent in the following paragraphs.

Intermediate the objective lens arrangement 12 and the focal plane 14, there is provided a shutter mechanism that is shown generally at 34 comprising two overlapping shutter blade elements 36 and 38 (see FIGS. 2-6) of the so-called scanning type which will be subsequently described in greater detail herein. The photographic camera apparatus is also provided with a photographic cycle initiating button as shown at 40 in FIG. 1 wherein the depression of the button 40 operates to commence an exposure interval by ultimately effecting the release of the shutter blade elements 36 and 38 in a manner to be subsequently described herein.

Referring now to FIGS. 2-6, it can be seen that a pair of scene light admitting primary apertures 44 and 46 are provided respectively in the blade elements 36 and 38 to collectively define a progressive variation of effective aperture openings in accordance with simultaneous longitudinal and lateral displacement of one blade element with respect to the other blade element in a manner as is fully described in U.S. Pat. No. 3,942,183 entitled "Camera with Pivoting Blades," by G. Whiteside, issued Mar. 2, 1976, and assigned in common herewith. The apertures 44 and 46 are selectively shaped so as to overlap a light entering exposure opening 48 in a base block casting 42 thereby defining a gradually varying effective aperture size as a function of the position of the blade elements 36 and 38.

Figure 5:
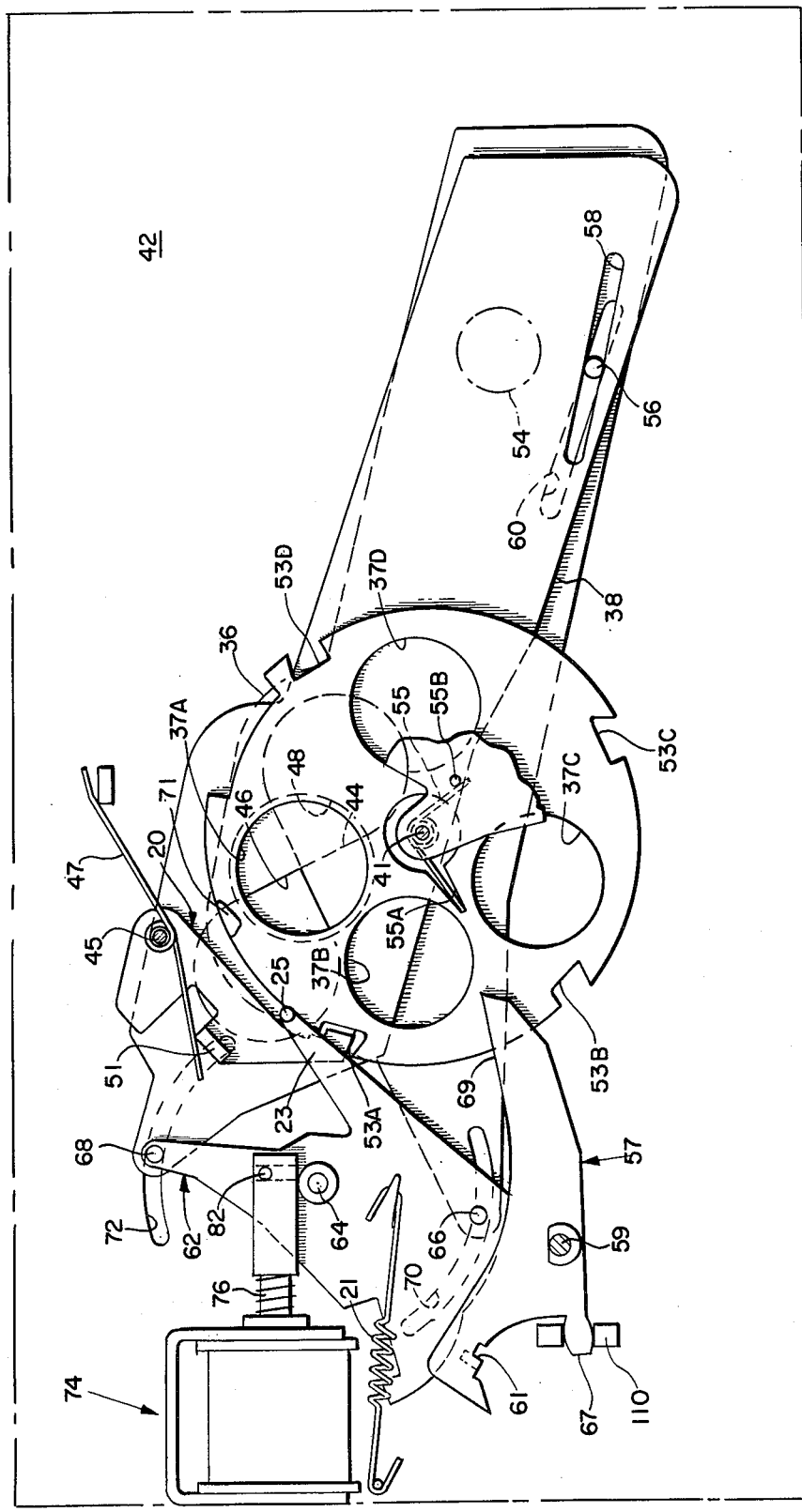
FIG. 5 is a front elevational view showing portions of the automatic lens focusing apparatus and shutter blade mechanism of FIG. 2 in still another position.
Figure 6:
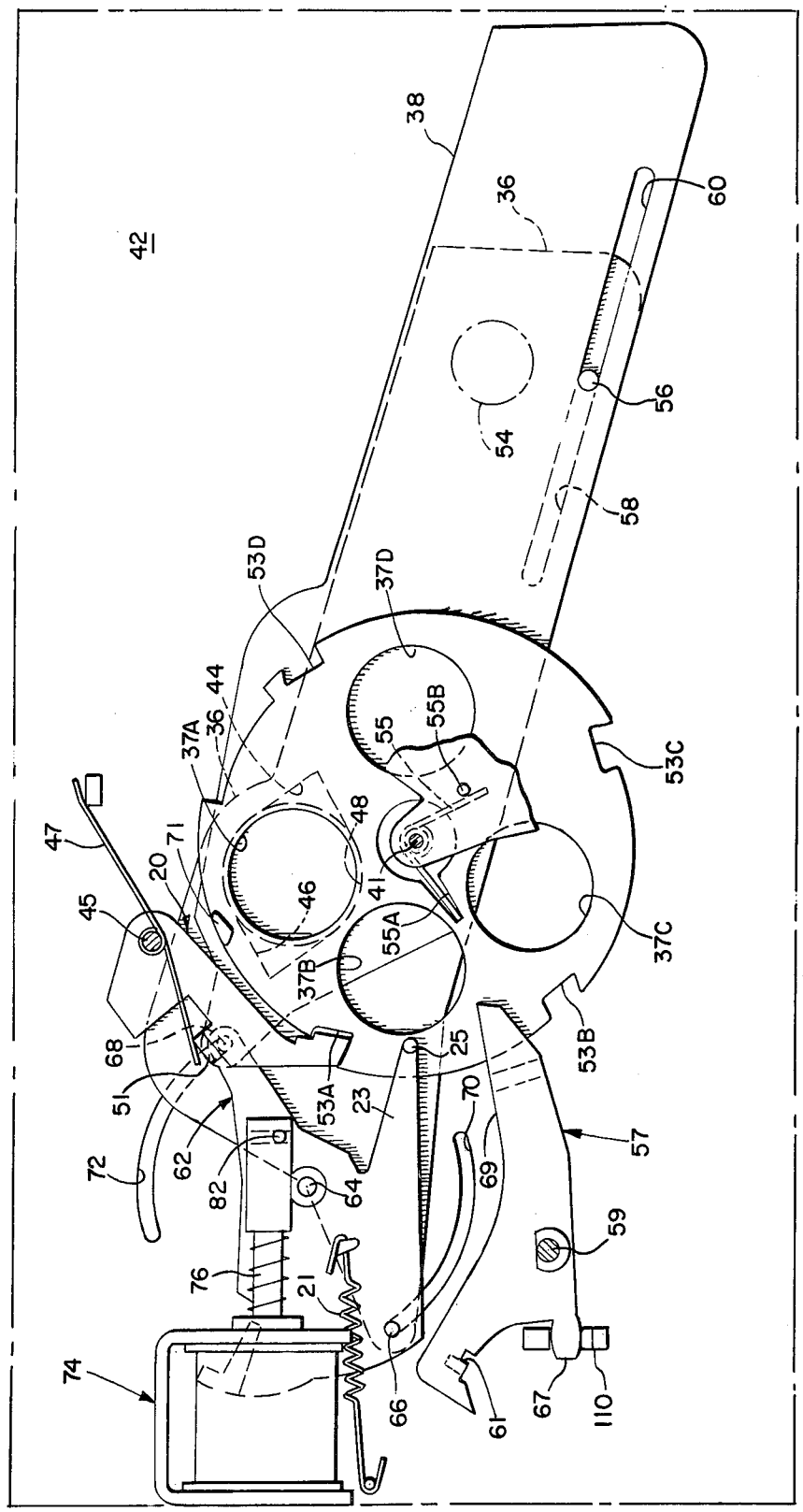
FIG. 6 is a front elevational view showing portions of the automatic lens focusing apparatus and shutter blade mechanism of FIG. 2 in still another position.

Each of the blades 36 and 38 may additionally be configured to have corresponding photocell sweep secondary apertures shown respectively at 50 and 52. Secondary apertures 50 and 52 may be configured in correspondence with the shapes of scene light admitting primary apertures 44 and 46. As is readily apparent, the secondary apertures 50 and 52 also move in correspondence with the primary apertures 44 and 46 to define a small secondary aperture for admitting the passage of scene light to a light detecting or photoresponsive element 54 stationed in the base block as best seen in FIG. 5.

Projecting from the base block casting 42 at a location spaced laterally apart from the light entering exposure opening 48 is a pivot pin or stud 56 which pivotally and translatably engages elongated slots 60 and 58 formed in respective shutter blade elements 36 and 38. Pin 56 may be integrally formed with the base block casting 42 and blade elements 36 and 38 may be retained in engaging relation with respect to the pin 56 by any suitable means such as peening over the outside end of the pin 56.

The opposite ends of the blade elements 36 and 38, respectively, include extended portions which pivotally connect to a walking beam 62. The walking beam 62, in turn, is disposed for rotation relative to the base block casting 42 by pivotal connection to a projecting pivot pin or stud 64 which may be integrally formed with the base block casting 42 at a location spaced laterally apart from the light entry exposure opening 48. The walking beam 62 may be pivotally retained with respect to the pin 64 by any conventional means. In the preferred mode, the walking beam 62 is pivotally connected at its distal ends to the shutter blade elements 36 and 38 by respective pin members 66 and 68 which extend laterally outward from the walking beam 62. Pin members 66 and 68 are preferably circular in cross-section and extend through respective openings in respective blade elements 36 and 38 so as to slidably engage respective arcuate tracks 70 and 72 which may be integrally formed within the base block casting 42. The arcuate tracks 70 and 72 operate a inhibit disengagement of the blade elements 36 and 38 from their respective pin members 66 and 68 during operation of the exposure control system. Thus, the walking beam 62 and shutter blade elements 36 and 38 collectively define a blade mechanism together with a means for mounting the blade mechanism for displacement including pivot pins 56 and 64.

Drive means are provided for displacing the blade mechanism 34 and include an opening tension spring 21 and a tractive electromagnetic device such as a solenoid as shown generally at 74 for displacing the shutter blade elements 36 and 38 with respect to each other and the base block casting 42 in a manner to be subsequently described herein. The tension spring 21 is fixedly connected at one end to the base block casting 42 and at its other end to the walking beam 62 so as to yieldably bias the walking beam 62 to rotate in a clockwise direction. The solenoid 74 includes an internally disposed cylindrical plunger unit 76 which retracts inwardly into the body of the solenoid upon the energization of the solenoid winding. The solenoid plunger 76 includes an end cap 78 at the outside end thereof together with a vertical slot or groove 80 within the end cap 78 for loosely engaging the pin 82 extending outwardly from the walking beam 62. In this manner, the solenoid plunger 76 is affixed to the walking beam 62 so that longitudinal displacement of the plunger 76 operates to rotate the walking beam 62 around the pivot pin 64 so as to displace the shutter blades 36 and 38.

The walking beam 62 includes an integral depending arm portion 23 extending outwardly therefrom to define an integral pin portion 25 at the outside end thereof. The pin portion 25 engages an integral right angle tab portion 51 from the lens pawl 20 for reasons which will become more apparent from the following discussion.

In order that the shutter blade elements 36 and 38 may be maintained in their scene light blocking arrangement without requiring the continuous energization of the solenoid 74, there is provided a combined walking beam latch and lens actuator member 57 disposed for rotation about a pivot pin or shaft 59 which may be integrally molded with respect to the base block casting 42 and as is fully described in U.S. patent application Ser. No. 17,196 entitled "Walking Beam Latch and Lens Disc Actuator Arrangement," by B. Johnson, filed Mar. 5, 1979, in common assignment herewith. The latch and actuator member 57 includes a laterally projecting integrally molded tooth or tang 61 which extends into the locus of travel of the walking beam 62 to engage an edge 65 thereof thereby inhibiting clockwise rotation of the walking beam 62. The latch and actuator member 57 also includes a depending arm portion 67 engaged by the end of an actuator arm 110 which generally defines a yoke with one side of the yoke comprising an integral spring finger 96 (FIG. 3A). The actuator arm 110 is moved downwardly and then upwardly in a manner as is more fully described in U.S. Pat. No. 4,040,072 entitled "Shutter Latch Arrangement Releasable Through Shutter Blade Actuation and Resettable Through Film Advancement," by B. Johnson et al., issued Aug. 2, 1977, and operates to first impart counterclockwise rotation to the latch and actuator member 57 in a manner as will be more fully described herein.

In its preferred embodiment, the aforementioned objective lens arrangement 12 comprises a plurality of lens elements 37A through 37D. A disc-like lens holding member 39 disposed for rotation about a center pivot pin or axis 41 which may also project outwardly from the base block casting 42 provides means for mounting the plurality of lens elements 37A through 37D. The plurality of lens elements 37A through 37D are disposed on the lens holding member 39 in circumferentially spaced-apart relation with respect to each other about the pivot pin 41. Each of the lens elements 37A through 37D has a different focal length and depth of field characteristic and corresponds respectively to a different one of the aforementioned plurality of focal positions as is fully described in U.S. Pat. No. 4,192,587 entitled "Proportional Fill Flash," by A. LaRocque et al., issued Mar. 11, 1980, in common assignment herewith and now incorporated by reference herein. As is now readily apparent, rotation of the lens holding member 39 about the pivot pin 41 operates to sequentially move each of the lens elements 37A through 37D into position overlying the exposure opening 48 in the base block casting 42 so as to sequentially focus images onto the focal plane 14 of the camera of photographic subjects located at progressively increasing distance ranges from the camera.

Figure 7:
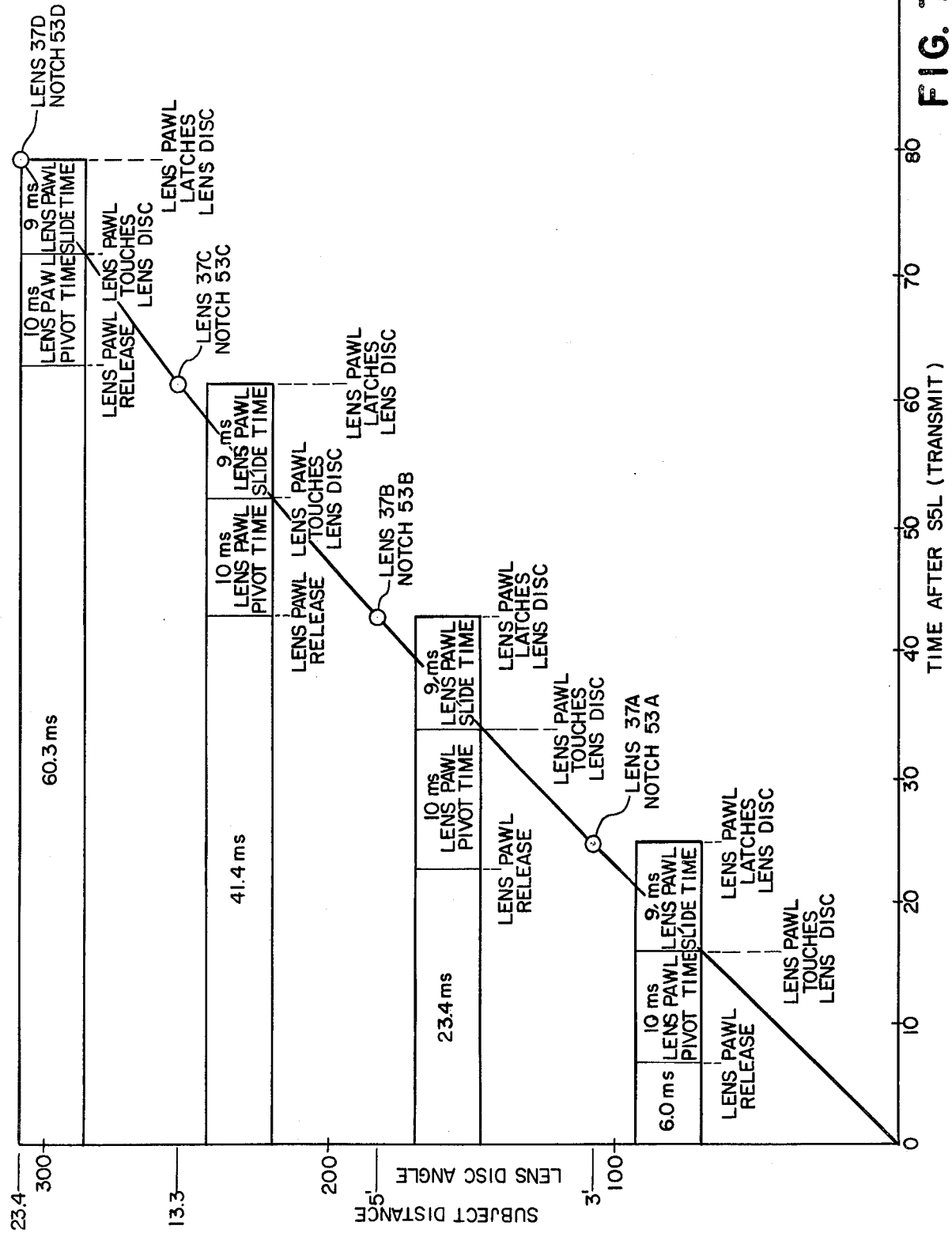
FIG. 7 is a graphical representation of subject distance and lens disc angle plotted as a function of elapsed time from initial displacement of the lens disc.

When each lens element 37A through 37D overlies the exposure opening 48, the objective lens arrangement 12 operates to focus a subject located at any distance from the camera within a given range of distances, as shown graphically in FIG. 7, where subject distance and lens disc 39 angle are plotted as a function of elapsed time from the initial displacement of the lens disc 39. Each circle in the graph respectively represents one of the lens elements 37A through 37D being positioned in overlying relation with respect to the exposure opening 48 to define a different one of the aforementioned plurality of focal positions, and the effective subject range for each focal position is defined by the difference between the subject distance for the lens element which overlies the exposure opening to define the focal position and the subject distance for the immediately preceding lens element.

As will be readily understood by those skilled in the art, additional lens elements (not shown) may be provided in fixed optical alignment with the exposure opening 39 to cooperate with the lens elements 37A through 37D in defining the objective lens arrangement 12 for the camera. Thus, one of the lens elements 37A through 37D may be entirely omitted with an open space provided in its place whereupon the additional lens elements provided in optical alignment with the exposure opening 48 would operate by themselves to define the camera objective when the open space is rotated over the exposure opening 39. Thus, the lens elements 37A through 37D would preferably be relatively weak in comparison with the other lens elements (not shown) in optical alignment therewith.

The aforementioned latch and actuator member 57 includes a leading edge portion 69 which engages an integral pin 71 extending laterally outward from the lens holding member 39 so as to enable the latch and actuator member 57 to rotatably drive the lens holding member 39 about its center pivot pin 41 in concert with the unlatching of the walking beam 62 in a manner to be more fully described in the following discussion.

The lens pawl 20 is disposed for rotation about a pivot pin or axis 45 which may be integrally formed with respect to the base block casting 42 and is yieldably biased for rotation about the pivot pin 45 in a counterclockwise direction by means of a torsion spring 47 interconnected between the base block casting and lens pawl 20. The lens pawl 20 also includes an integral depending tang portion 49 for respective engagement in one of a plurality of catches or notches 53A through 53D disposed in circumferentially spaced-apart relation about the periphery of the lens holding member 39. A torsion spring 55 having one arm thereof engaged against a fixed pin 55B from the base block casting 42 and another arm thereof engaged in a complementary slot 55A on the lens holding member 39 is provided for resiliently biasing the lens holding member 39 to rotate in a counterclockwise direction to return the lens holding member 39 to its initial position subsequent to the lens holding member being rotated by the latch and actuator member 57.

The camera may be provided with an integral electronic flash or strobe (not shown). The strobe charging and triggering circuitry may be of a type well known in the art as is more fully disclosed in U.S. Pat. No. 4,064,519 entitled "Regulated Strobe For Camera With Sixth Flash Inhibit," issued Dec. 20, 1977, in common assignment herewith. The strobe preferably derives charging power from a battery that is insertable within the camera in correspondence with the film pack or cassette in a manner that is well known in the art for Polaroid SX-70-type film cassettes and cameras.

The aforementioned film cassette battery is also preferably utilized to power the circuitry in FIG. 1 in its entirety by way of three switches $S_1$, $S_2$, and $S_3$ in a manner as is more fully described in U.S. Pat. No. 4,040,072, supra. The camera 10 is also provided with a motor and solenoid control circuit 116 which operates in a manner also more fully described in U.S. Pat. No. 4,040,072, supra. As is readily apparent, the motor and solenoid control circuit 116 operates to control the energizing current delivered to the solenoid 74 and to a motor 118. The film units intended for use with the camera of this invention are preferably of the self-developing type and the motor 118 is provided to effect the advancement and processing of the self-developing film units in a well-known manner.

Referring now back to FIG. 1, there can be seen the additional control circuitry for the automatic lens focusing apparatus of this invention. The sonar ranging signal 30 is derived from a clock 82 which is powered upon closure of the switches $S_1$ and $S_2$ in a manner to be subsequently described herein. The clock pulse from the clock circuit 82 is directed to a transmit control circuit 84 which controls the transmission of the clock pulse to the sonic rangefinder 22 as a function of a logic signal derived upon closure of the switch $S_3$. The output clock pulse from the transmit control circuit 84 is also directed to a frequency divide circuit 86 which operates to reduce the frequency of the clock pulse and thereafter direct the reduced frequency clock pulse to input a binary counter 88. The output from the counter 88 is thereafter utilized to sequence a plurality of inverter latch circuits as shown at 90A through 90C which correpond respectively to the first three subject ranges as shown in the graph of FIG. 7. The latch circuits 90A through 90C provide output signals respectively to AND gates 92A through 92C which also receive input signals from the echo detector circuit 32 for reasons which will become apparent from the following discussion. The output signals from the AND gates 92A through 92C are directed respectively to latch circuits 94A through 94C which, in turn, provide output signals respectively to AND gates 98A through 98C. The AND gates 98A through 98C receive other input signals from the binary counter 88 and, in turn, provide output signals to an OR gate 92, the output of which provides a control signal to the motor and solenoid control circuit 116.

Figure 2:
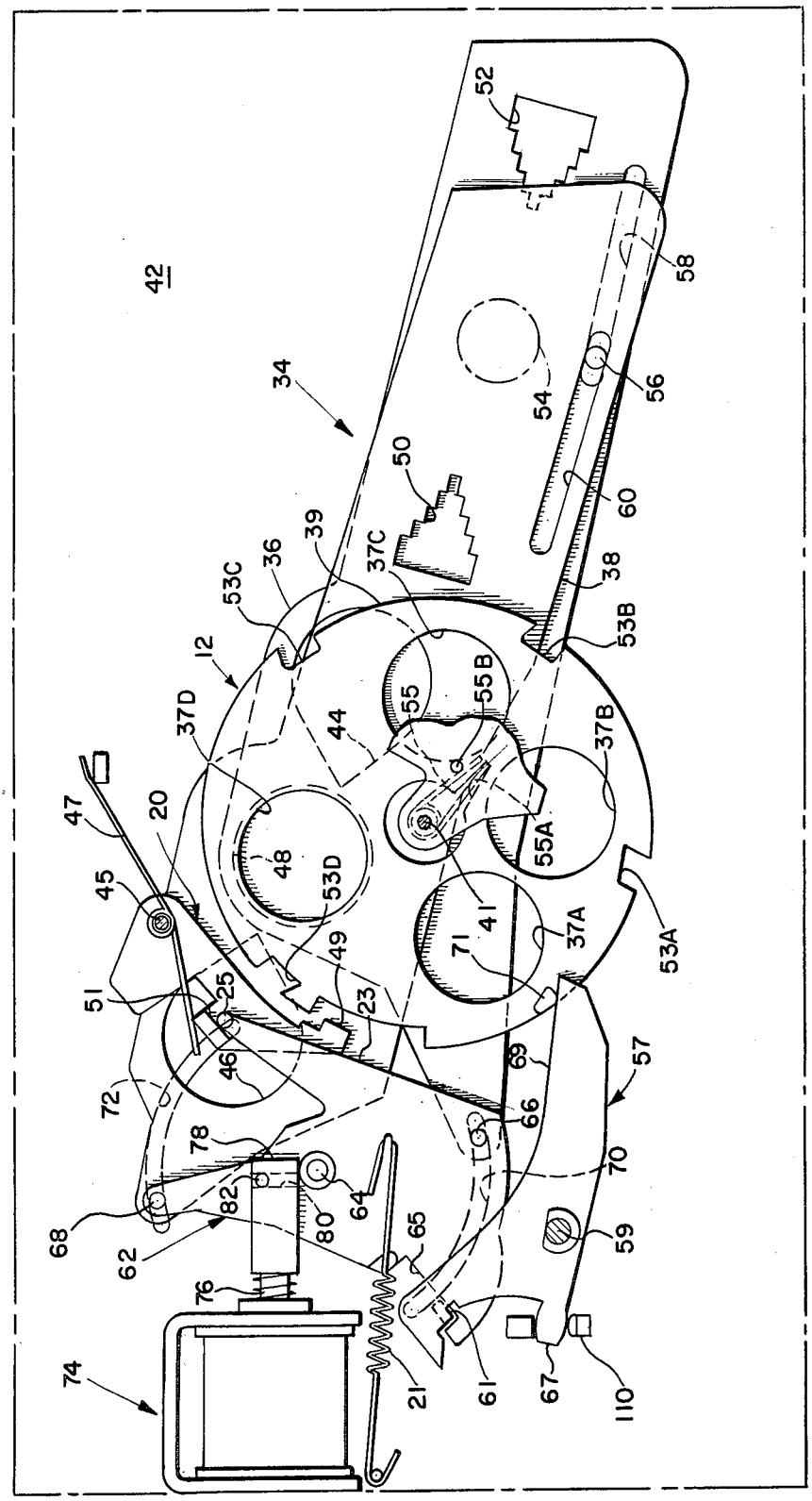
FIG. 2 is a front elevational view showing portions of the automatic lens focusing apparatus and shutter blade mechanism of FIG. 1.

A photographer may initiate a photographic exposure cycle by manually actuating the button 40 so as to close the switch $S_1$ in a manner as is fully described in U.S. Pat. No. 4,040,072, supra. Closure of the switch $S_1$, in turn, operates to energize the motor and solenoid control circuit 116 which, in turn, energizes the solenoid 74 to retract the plunger 76 inwardly and rotate the walking beam 62 in a counterclockwise direction from its position as shown in FIG. 2 to its position as shown in FIG. 3. During this counterclockwise rotation, the leading edge of the walking beam pin portion 25 engages the right angle tab portion 51 so as to rotate the lens pawl 20 in a counterclockwise direction upon its pivot pin 45 from its position as shown in FIG. 2 to its position as shown at FIG. 3.

Figure 4:
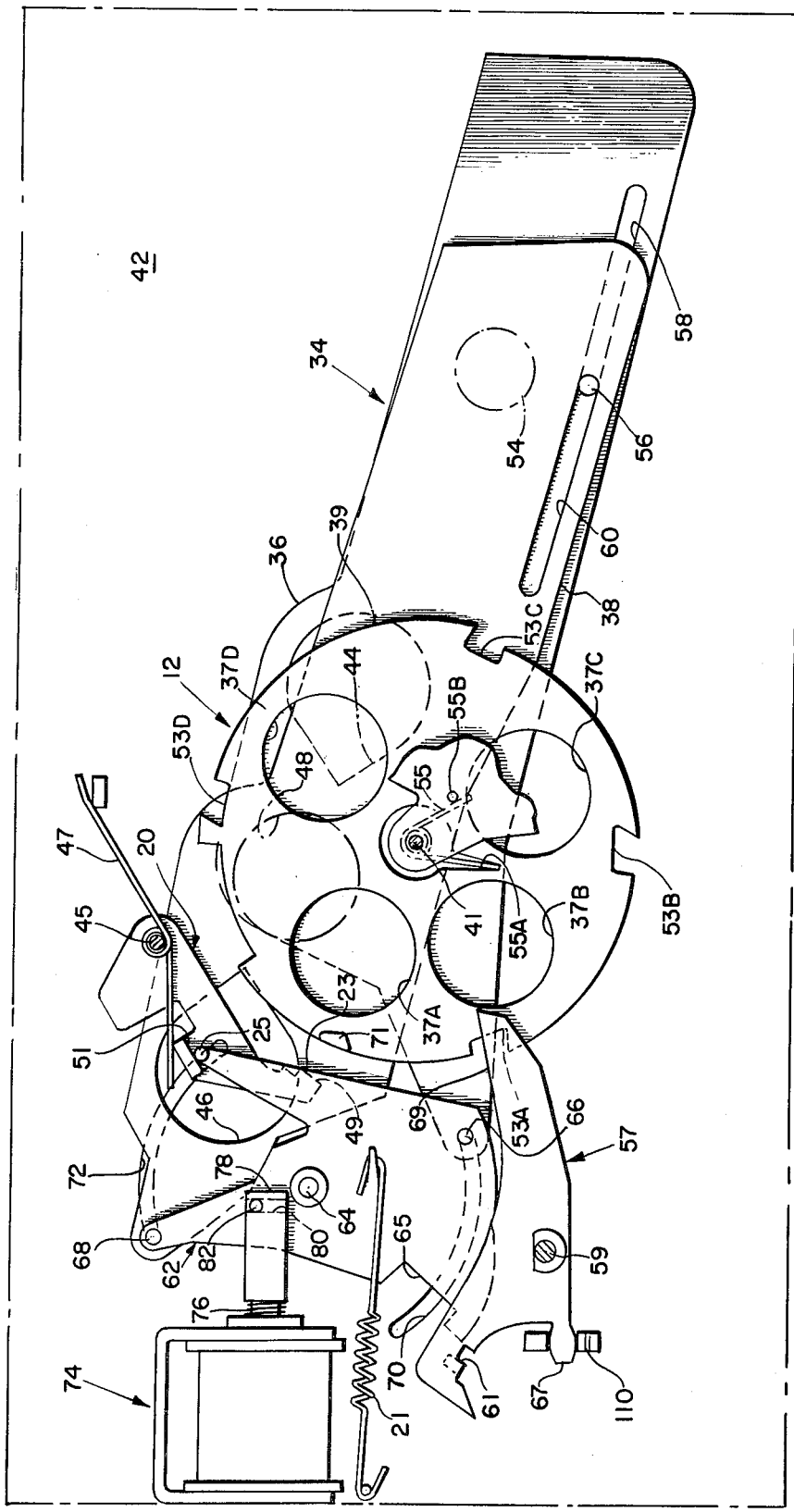
FIG. 4 is a front elevational view showing portions of the automatic lens focusing apparatus and shutter blade mechanism of FIG. 2 in still another position.

Referring now to FIG. 3, it can also be seen that the aforementioned counterclockwise direction of the walking beam 62 operates to displace the trailing edge 65 thereof out of engagement with the latching tang 61. The latch actuator member 57 is thereafter rotated in a counterclockwise direction about its pivot pin 59 by the downward movement of the actuator arm 110 which results directly from the aforementioned manual actuation of the button 40 in the manner as is fully described in U.S. Pat. No. 4,040,072, supra. In this manner, the latch actuator member 57 is rotated in a counterclockwise direction from its position as shown in FIG. 3 to its position as shown in FIG. 4 so as to permit the subsequent rotation of the walking beam 62 in a clockwise direction toward its maximum aperture defining position. Movement of the actuator arm 110 in a downward direction affecting release of the latch and actuator member 57 also operates to simultaneously affect the closing of the switches $S_2$ and $S_3$ in a manner as is again fully described in U.S. Pat. No. 4,040,072, supra.

Counterclockwise rotation of the latch and actuator member 57 also operates to cause the leading edge of the latch and actuator member 57 to impact upon the lens holding member pin 71 so as to rotate the lens holding member 39 and its associated lens elements 37A through 37D in a clockwise direction about the pivot pin 41 thereafter sequentially moving each of the lens elements 37A through 37D into focal positions overlapping the light entry exposure opening 48 as shown pictorially in FIG. 4 and graphically in FIG. 7.

Closure of the switch $S_3$, in turn, operates to power down the solenoid 74 from the initial high current energization condition required to retract the plunger 76 to a low current energization condition required to hold the plunger in its retracted position as shown in FIG. 3 in a manner as is fully described in U.S. Pat. No. 4,192,587, supra. Closure of the switch $S_3$ in the aforementioned manner also operates to actuate the sonar rangefinder 22 to transmit the sonar ranging signal 30 by providing the requisite logic signal to the transmit control circuit 84 so as to transmit the clock pulse from the clock circuit 82 to the range signal transmitting circuit 24. The transmit control circuit 84 also directs the clock pulse to the frequency divide circuit 86 so as to input the counter 88 in correspondence with the transmission of the sonar rangefinding signal 30.

Receipt of the echo signal by the transducer 28 signals the echo detector 32 to provide an output signal to gate a respective one of the AND gates 92A through 92C as a function of the output signal logic level from the latches 90A through 90C. Referring now to the graph of FIG. 7 in conjunction with the circuit of FIG. 1, it can be seen that if a photographic subject is located within the first and nearest camera-to-subject distance range of less than three feet, an echo signal will be received within approximately 5.5 milliseconds of transmission of the sonar ranging signal and the AND gate 92A will be switched to provide a high (binary logic 1) output signal level since the latch 90A also provides a high (binary logic 1) output signal level for the same 5.5 millisecond time interval until being gated by the binary counter 88 to switch to a low (binary logic 0) output signal level. The high (binary logic 1) output signal level from the AND gate 92A, in turn, will switch the latch 94A to provide a high (binary logic 1) output signal level to enable the AND gate 98A to switch to a high (binary logic 1) output signal level upon receipt of a high (binary logic 1) output signal from the counter 88 at the expiration of approximately 6 milliseconds from the transmission of the sonar ranging signal and the initial rotation of the lens disc 39. The high (binary logic 1) output signal level from the AND gate 98A, in turn, will operate by way of the OR gate 92 to provide an assertive output logic signal to the motor and solenoid control circuit 116 which, in turn, will operate to deenergize the solenoid 74 and release the walking beam 62 for rotation by the opening drive spring 21. The shutter blade mechanism 34 will thereafter be driven through a range of progressively varying aperture sizes to define a photographic exposure cycle in a manner as is fully described in U.S. Pat. No. 4,192,587, supra. Clockwise rotation of the walking beam 62 in the aforementioned manner also operates to disengage the pin 25 from the right angle tab portion 51 of the lens pawl 20 so as to release the lens pawl 20 for rotation in a counterclockwise direction about its pivot pin 45 under the urging influence of the biasing spring 47. The depending tang portion 49 will then engage the periphery of the lens disc 39 in the space between the pair of notches 53D and 53A.

Referring now to the graph of FIG. 7, it can be seen that the elapsed time period from the initial release of the lens pawl 20 by the pin 25 of the walking beam 62 until its engagement against the periphery of the lens disc 39 is in the order of 10 milliseconds. After engaging the periphery of the lens disc 39, the lens disc 39 continues to rotate in a counterclockwise direction until the tang 49 engages the trailing edge of the notch 53B so as to stop the rotation of the lens disc 39 and locate the lens element 37A in the overlying focal position. The lens pawl 20 slide time along the periphery of the lens disc 39 is in the order of 9 milliseconds. In this manner, the lens pawl 20 is released to engage the periphery of the lens disc 39 in the space between the notches regardless of where the photographic subject is actually located within the distance range so as to avoid the possibility of the lens pawl 20 bouncing off the lens disc 39 as might otherwise occur were the lens pawl 20 to initially strike the lens disc 39 at one of its notches. In addition, since the speed of the lens disc 39 need not correspond directly to the elapsed time between transmission and receipt of the sonar ranging signal, it is possible to substantially reduce the rotational speed of the lens disc 39.

If the photographic subject is located in the second camera-to-subject distance range from between three and five feet, the echo signal will be received by the transducer 38 at a time interval from between approximately 5.5 milliseconds and 9.1 milliseconds subsequent to transmission of the sonar ranging signal and initial rotation of the lens disc 39. The output signal from the echo detect circuit 32, in turn, operates to switch the AND gate 92B to provide a high (binary logic 1) output signal level since the latch 90B provides a high (binary logic 1) output signal level for the same 9.1 millisecond time interval until being gated by the binary counter 88 to switch to a low (binary logic 0) output signal level. The high (binary logic 1) output signal level from the AND gate 92B, in turn, will switch the latch 94B to provide a high (binary logic 1) output signal level to enable the AND gate 98B to switch to a high (binary logic 1) output signal level upon receipt of a high (binary logic 1) output signal from the counter 88 at approximately 23.4 milliseconds subsequent to the transmission of the sonar ranging signal and initiation of rotation of the lens disc 39. The high (binary logic 1) output signal level from the AND gate 98B will operate by way of the OR gate 92 to provide an assertive output logic signal to the motor and solenoid control circuit 116 to deenergize the solenoid 74 and release the walking beam 62 for rotation by the opening drive spring 21 in the aforementioned manner. As previously discussed, clockwise rotation of the walking beam 62 operates to disengage the tang 24 from the right angle tab portion 51 of the lens pawl 20 so as to release the lens pawl 20 for rotation against the outer periphery of the lens disc 39.

Referring to the graph of FIG. 7, it can be seen that the lens pawl 20 again takes approximately 10 milliseconds to engage the outer periphery of the lens disc 39 subsequent to its release by the pivot pin 45 and approximately another 9 milliseconds to slide along the outer periphery of the lens disc 39 until engaging the notch 37B so as to stop the rotation of the lens disc 39 and locate the lens 37B in the overlying focal position. Again, the lens pawl 20 is released in a manner ensuring its engagement against the outer periphery of the lens disc 39 in the space between the pair of adjacent notches 37A and 37B so as to avoid the possibility of lens pawl bounce regardless of where the photographic subject is actually located within the second distance range.

In like manner, if the photographic subject is located within the third camera-to-subject distance range from between 5 feet to 13.3 feet, the echo signal will be detected within a time interval from between approximately 9 milliseconds and 23.9 milliseconds subsequent to transmission of the sonar ranging signal and initial rotation of the lens disc 39. Receipt of the echo signal, in turn, will operate to switch the AND gate 92C to provide a high (binary logic 1) output signal level since the latch 90C also provides a high (binary logic 1) output signal level for the same 23.9 millisecond time interval until being gated by the binary counter 88 to switch to a low (binary logic 0) output signal level. The high (binary logic 1) output signal level from the AND gate 92C, in turn, will switch the latch 94C to provide a high (binary logic 1) output signal level to enable the AND gate 98C to switch to a high (binary logic 1) output signal level upon receipt of a high (binary logic 1) output signal from the counter 88 at approximately 41.4 milliseconds subsequent to the transmission of the sonar ranging signal and initiation of rotation of the lens disc 39. The high (binary logic 1) output signal level from the AND gate 98C will operate by way of the OR gate 92 to provide an assertive output logic signal to the motor and solenoid control circuit 116 so as to deenergize the solenoid 74 and release the lens pawl 20 for rotation against the periphery of the lens disc 39 in the aforementioned manner.

Referring again to the graph of FIG. 7, it can be again seen that the lens pawl 20 pivots for approximately 10 milliseconds before engaging the outer periphery of the lens disc 39 in the space between the notches 53B and 53C. The lens pawl 20 thereafter slides along the periphery of the lens disc 39 for approximately another 9 milliseconds until engaging the notch 53C to stop the lens disc 39 rotation and locate the lens 37C in the overlying focal position.

In like manner, if the photographic subject is located in the fourth or far distance range beyond 13.3 feet, an echo signal will be received subsequent to 23.9 milliseconds from transmission of the sonar ranging signal and initial rotation of the lens disc 39. As is readily apparent, all of the latches 90A through 90C are gated by the binary counter 88 to switch to a low (binary logic 0) output signal level prior to receipt of the echo for the far distance range and, hence, receipt of the far distance range echo will have no effect in switching the AND gates 92A through 92C. The binary counter 88 will ultimately provide an assertive logic output signal at approximately 60.3 milliseconds subsequent to transmission of the sonar ranging signal and actuation of the lens disc 39. The assertive logic signal from the binary counter 88, in turn, gates the OR gate 92 to provide an assertive logic signal to the motor and solenoid control circuit 116 thereby deenergizing the solenoid 74 and releasing the shutter blade mechanism and lens pawl 20 for movement as previously discussed.

Referring to the graph of FIG. 7, it can be seen that the lens pawl again requires approximately 10 milliseconds subsequent to its release to engage the outer periphery of the lens disc 39 in the space between the notches 53C and 53D. The lens pawl 20 thereafter slides along the periphery of the lens disc 39 for approximately another 9 milliseconds until engaging the notch 53D so as to stop the lens disc 39 and locate the lens 37D at the overlying focal position.

As is now readily apparent, the timing sequence provided by the aforementioned logic circuits in conjunction with the counter 88 allows the lens pawl to be released at times ensuring that the lens pawl engages the lens holding member 39 in a space between a pair of adjacent notches thereby avoiding the possibility of lens pawl bounce which might otherwise occur if the lens pawl 20 were to initially strike the lens disc 39 in the area of a notch. In addition, it will be readily appreciated that the rotational speed of the lens disc 39 may be substantially slowed so that each lens element reaches its respective focal position at an elapsed time from its initial displacement greater than the elapsed time from transmission to receipt of a sonar ranging signal for a photographic subject located within the distance range corresponding to that focal position.

Figure 8:
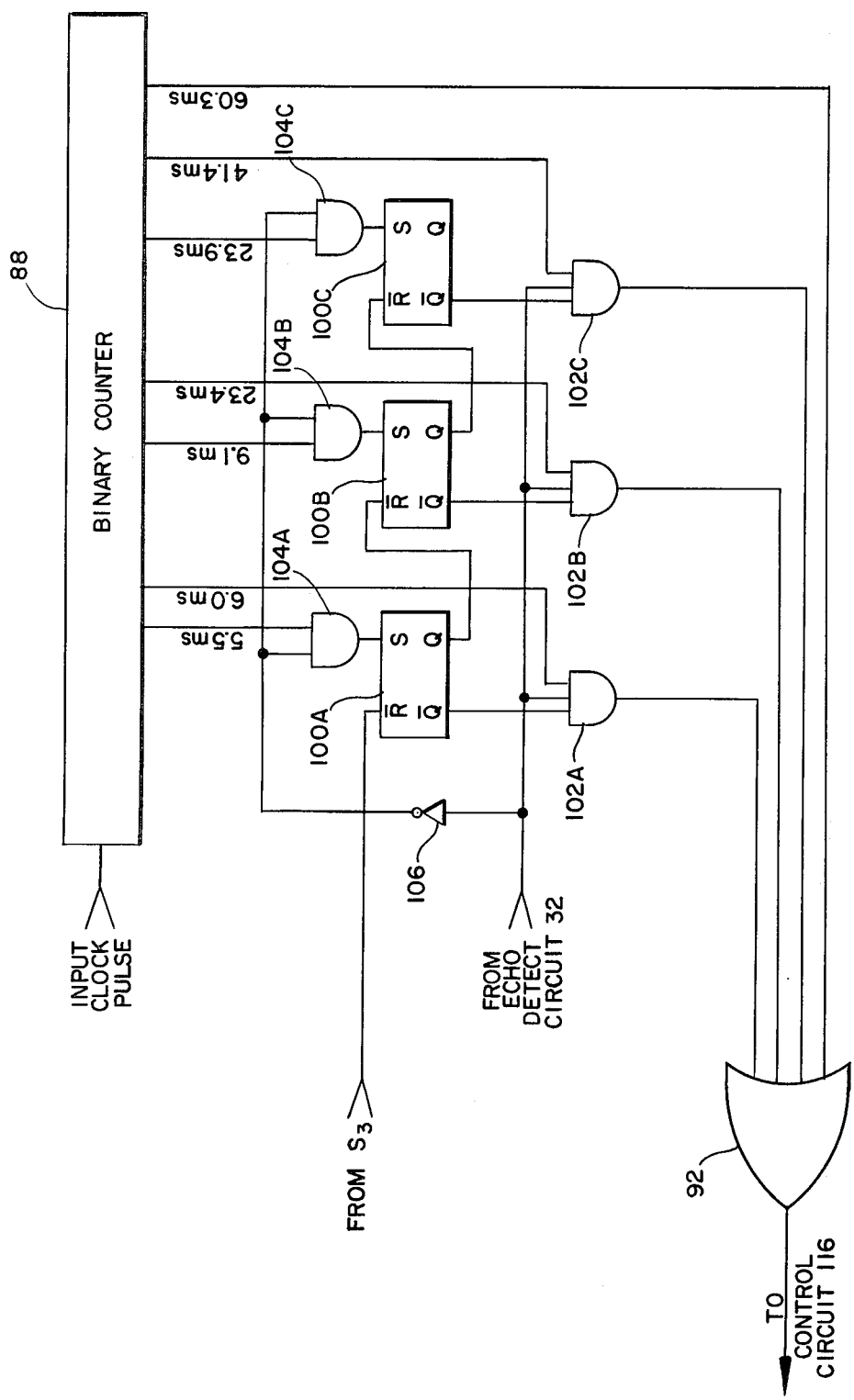
FIG. 8 is a block circuit diagram showing an alternate preferred embodiment for a portion of the diagram of FIG. 1.

Referring now to FIG. 8 where like numerals designate previously described elements, there is shown an alternate preferred embodiment for the aforementioned binary logic circuits. A plurality of flip-flop circuits 100A–100C connect respectively to a plurality of AND gates 102A-102B to provide the solenoid release signals to the motor and solenoid control circuit 116 by way of the OR gate 92. The flip-flops 100A-100C are set from counter output lines at 5.5 milliseconds, 9.1 milliseconds and 23.9 milliseconds respectively by way of AND gates 104A, 104B and 104C.

In operation closure of the switch S₃ will reset the flip-flop 100A so that output terminal $\overline{Q}$ provides a low (binary logic 0) output signal level while conversely output terminal Q provides a high (binary logic 1) output signal level. If the photographic subject is located within the first and nearest camera-to-subject distance range of less than three feet, then an echo signal will be received within approximately 5.5 milliseconds of transmission of the sonar ranging signal and provide a high (binary logic 1) signal level to one input terminal of the AND gate 102A and a low (binary logic 0) signal level to one input terminal of the AND gate 104A by way of an inverter 106. Subsequent receipt of a high (binary logic 1) output signal level from the counter 88 at the expiration of approximately 6 milliseconds from the transmission of the sonar ranging signal and the initial rotation of the lens disc 39 operates to switch the AND gate 102A to provide the high (binary logic 1) output signal level to release the solenoid in the aforementioned manner.

If the photographic subject is located in the second camera-to-subject distance range from between three and five feet, then the echo signal will be received at an interval from between approximately 5.5 milliseconds and 9 milliseconds subsequent to transmission of the echo signal. As is readily apparent, receipt of the echo later than 5.5 milliseconds operates to switch the AND gate 104A to provide a high (binary logic 1) output signal level thereby setting the flip-flop 100A and changing the output signal levels therefrom at terminal Q to a high (binary logic 1) and at output terminal $\overline{Q}$ to a low (binary logic 0). This, in turn, resets the flip-flop 100B to provide a low (binary logic 0) output signal level at terminal Q and a high (binary logic 1) output signal level at terminal $\overline{Q}$. Subsequent receipt of a high (binary logic 1) output signal from the counter 88 at the expiration of approximately 23.4 milliseconds from the transmission of the sonar ranging signal and the initial rotation of the lens disc 39 operates to switch the AND gate 102B to provide the high (binary logic 1) output signal to release the solenoid in the aforementioned manner.

In like manner, if the photographic subject is located in the third camera-to-subject distance range from between 5 feet to 13.3 feet, then the echo signal will be received at an interval from between approximately 9.1 milliseconds to 23.9 milliseconds subsequent to transmission of the echo signal. As is also readily apparent, receipt of the echo later than 9.1 milliseconds operates to switch the AND gate 104B to provide a high (binary logic 1) output signal level thereby setting the flip-flop 100B and changing the output signal levels therefrom at terminal Q to a high (binary logic 1) and at an output terminal $\overline{Q}$ to a low (binary logic 0). This, in turn, resets the flip-flop 100C to provide a low (binary logic 0) output signal level at terminal Q and a high (binary logic 1) output signal level at terminal $\overline{Q}$. Subsequent receipt of a high (binary logic 1) output signal level from the counter 88 at the expiration of approximately 41.4 milliseconds from the transmission of the sonar ranging signal and the initial rotation of the lens disc 39 operates to switch the AND gate 102C to provide the high (binary logic 1) output signal to release the solenoid in the aforementioned manner.

In like manner, if the subject is located in the fourth or far distance range beyond 13.3 feet, an echo signal will be received subsequent to 23.9 milliseconds and flip-flop 100C will be set in the aforementioned manner so that the assertive output logic signal provided by the binary counter at approximately 60.3 milliseconds subsequent to transmission of the sonar ranging signal and actuation of the lens disc 39 will ultimately provide the controlling solenoid release signal.

It should be readily understood that a photographic exposure cycle commences in synchronism with release of the walking beam 62 and lens pawl 20 in a manner as is more fully described by U.S. Pat. No. 4,192,587, supra. and thus will not be further described herein. Other embodiments of the invention including additions, subtractions and deletions and other modifications of the preferred disclosed embodiments of the invention will be obvious to those skilled in the art and are within the scope of the following claims.

What is claimed is:

1. An automatic lens focusing apparatus for automatically focusing image forming rays at a camera focal plane, said apparatus comprising:

means for generating and transmitting a sonar ranging signal and for providing an indication upon detection of an echo signal reflected from a photographic subject at an elapsed time subsequent to the transmission of the sonar ranging signal;

an objective lens arrangement;

means for mounting said objective lens arrangement for displacement between a plurality of focal positions, said objective lens arrangement being adapted to focus an image of a subject located at a different distance from said objective lens arrangement within a given range of distance at the focal plane of a camera at each of its said focal positions;

means for effecting the displacement of said objective lens arrangement so that said objective lens arrangement reaches each one of its said plurality of focal positions respectively at an elapsed time from its initial displacement greater than the elapsed time from transmission to receipt of an echo signal by said sonar ranging means in an event that a photographic subject is located from said objective lens arrangement by a distance within the given range of distances corresponding to that one focal position in which said objective lens arrangement would focus an image of the subject at the focal plane of the camera; and means responsive to receipt of an echo signal from a subject by said sonar ranging means for stopping the displacement of said objective lens arrangement at the one focal position in which the objective lens arrangement would focus an image of the subject at the focal plane of the camera, said stopping means operating to stop said objective lens arrangement at an elapsed time subsequent to receipt of the echo signal corresponding to the difference in the elapsed time for said objective lens arrangement to reach its said one focal position from its initial displacement and the elapsed time from transmission to receipt of the echo signal.

2. The automatic lens focusing apparatus of claim 1 wherein said mounting means comprises a plurality of spaced apart catches corresponding respectively to said plurality of focal positions and said stopping means includes means for engaging a respective one of said catches to stop the displacement of said objective lens arrangement and timing means for releasing said catch engaging means to first engage said objective lens arrangement in the space between a pair of adjacent catches such that the continued displacement of the objective lens arrangement operates to thereafter move a respective one of said catches into engagement with said catch engaging means to stop the displacement of said objective lens arrangement at the appropriate focal position corresponding to the distance range in which the subject is located.

3. The automatic focusing apparatus of claim 2 wherein said stopping means also comprises a counter connected to count in correspondence with said sonar ranging signal and a plurality of logic circuits operatively connected with respect to said counter and said sonar ranging means to provide a catch engaging means release signal at an elapsed time subsequent to receipt of the echo signal sufficient to enable said catch engaging means to first engage said objective lens arrangement in the space between the pair of adjacent catches correspondingly respectively to the focal positions for the distance range in which the subject is located and the immediately preceeding distance range.

4. The automatic lens focusing apparatus of claim 2 or 3 wherein said lens mounting means comprises a lens holding member disposed for rotation about a center axis and said objective lens arrangement comprises a plurality of lens elements on said lens holding member in circumferentially spaced apart relation with respect to each other about said center axis with each of said lens elements corresponding to a different one of said plurality of focal positions such that rotational displacement of said lens holding member about said center axis by said displacement means operates to sequentially move each of said lens elements into its said one focal position.

5. The lens focusing apparatus of claim 4 wherein said sonar ranging signal is transmitted simultaneously with the initiation of rotational displacement of said lens holding member by said displacement means.

6. The lens focusing apparatus of claim 5 wherein said plurality of spaced apart catches comprise a plurality of notches disposed in circumferentially spaced-apart relation about the outer periphery of said lens holding member and said catch engaging means comprises a lens pawl releasable for engagement against the outer periphery of said lens holding member in the space between a pair of adjacent notches such that the continued rotation of the lens holding member operates to thereafter move a respective one of said notches into position to receive said lens pawl and thereby stop the displacement of said lens holding member.

7. A camera having means for defining a focal plane, said apparatus comprising:
means for generating and transmitting a sonar ranging signal and for providing an indication upon detection of an echo signal reflected from a photographic subject at an elapsed time subsequent to the transmission of the sonar ranging signal;
an objective lens arrangement;
means for mounting said objective lens arrangement for displacement between a plurality of focal positions, said objective lens arrangement being adapted to focus an image of a subject located at a different distance from said camera within a given range of distances at the focal plane of the camera at each of its said focal positions;
means for effecting a displacement of said objective lens arrangement so that said objective lens arrangement reaches each one of its said plurality of focal positions respectively at an elapsed time from its initial displacement greater than the elapsed time from transmission to receipt of an echo signal by said sonar ranging means in an event that a photographic subject is located from said camera by a distance within the given range of distances corresponding to that one focal position in which said objective lens arrangement would focus an image of the subject at the focal plane of said camera; and
means responsive to receipt of an echo signal from a subject by said sonar ranging means for stopping the displacement of said objective lens arrangement at the one focal position in which the objective lens arrangement would focus an image of the subject at the focal plane of said camera, said stopping means operating to stop said objective lens arrangement at an elapsed time subsequent to receipt of an echo signal corresponding to the difference in the elapsed time for said objective lens arrangement to reach its said one focal position from its initial displacement and the elapsed time from transmission to receipt of the echo signal.

8. The camera of claim 7 wherein said mounting means comprises a plurality of spaced apart catches corresponding respectively to said plurality of focal positions and said stopping means includes means for engaging a respective one of said catches to stop the displacement of said objective lens arrangement and timing means for releasing said catch engaging means to first engage said objective lens arrangement in the space between a pair of adjacent catches such that the continued displacement of the objective lens arrangement operates to thereafter move a respective one of said catches into engagement with said catch engaging means to stop the displacement of said objective lens arrangement at the appropriate focal position corresponding to the distance range in which the subject is located.

9. The camera of claim 8 in which said stopping means also comprises a counter connected to count in correspondence with said sonar ranging signal and a plurality of logic circuits operatively connected with respect to said counter and said sonar ranging means to provide a catch engaging means release signal at an elapsed time subsequent to receipt of the echo sufficient to enable said catch engaging means to first engage said objective lens arrangement in the space between the pair of adjacent catches corresponding respectively to the focal positions for the distance range in which the subject is located and the immediately preceeding distance range.

10. The camera of claim 8 or 9 wherein said lens mounting means comprises a lens holding member disposed for rotation about a center axis and said objective lens arrangement comprises a plurality of lens elements on said lens holding member in circumferentially spaced apart relation with respect to each other about said center axis with each of said lens elements corresponding to a different one of said plurality of focal positions such that rotational displacement of said lens holding member about said center axis by said displacement means operates to sequentially move each of said lens elements into its said one focal position.

11. The camera of claim 10 wherein said sonar ranging signal is transmitted simultaneously with the initiation of rotational displacement of said lens holding member by said displacing means.

12. The camera of claim 11 wherein said plurality of spaced apart catches comprise a plurality of notches disposed in circumferentially spaced-apart relation about the outer periphery of said lens holding member and said catch engaging means comprises a lens pawl releasable for engagement against the outer periphery of said lens holding member in the space between a pair of adjacent notches such that the continued rotation of the lens holding member operates to thereafter move a respective one of said notches into position to receive said lens pawl and thereby stop the displacement of said lens holding member.

13. An automatic lens focusing apparatus for automatically focusing image forming rays at a camera focal plane, said apparatus comprising:
  means for generating and transmitting a sonar ranging signal and for providing an indication upon detection of an echo signal reflected from a photographic subject at an elapsed time subsequent to the transmission of the sonar ranging signal;
  an object lens arrangement;
  means for mounting said objective lens arrangement for displacement between a plurality of focal positions, said mounting means comprising a plurality of spaced apart catches corresponding respectively to said plurality of focal positions, said objective lens arrangement being adapted to focus an image of a subject located at a different distance from said objective lens arrangement within a given range of distances at the focal plane of a camera at each of its said focal positions;
  means for effecting a displacement of said objective lens so that said objective lens arrangement reaches each one of its said plurality of focal positions at a time correlated to an indication of an echo signal being provided from said sonic ranging means in an event that a subject is located from said objective lens arrangement at a distance at which said objective lens arrangement would focus an image thereof at the camera's focal plane; and
  means responsive to receipt of an echo signal from a subject by said sonar ranging means for stopping the displacement of said objective lens arrangement at the one focal position in which the objective lens arrangement would focus an image of the subject at the focal plane of the camera, said stopping means comprising means for engaging a respective one of said catches to stop the displacement of said objective lens arrangement and timing means for releasing said catch engaging means at an elapsed time subsequent to receipt of the echo sufficient to enable said catch engaging means to always first engage said objective lens arrangement in the space between a pair of adjacent catches such that the continued displacement of said objective lens arrangement operates to thereafter move a respective one of said catches into engagement with said catch engaging means to stop the displacement of said objective lens arrangement at the appropriate focal position corresponding to the distance range in which the subject is located.

14. The automatic focusing apparatus of claim 13 wherein said stopping means also comprises a counter connected to count in correspondence with said sonar ranging signal and a plurality of logic circuits operatively connected with respect to said counter and said sonar ranging means to provide a catch engaging means release signal at an elapsed time subsequent to receipt of the echo signal sufficient to enable said catch engaging means to first engage said objective lens arrangement in the space between the pair of adjacent catches corresponding respectively to the focal positions for the distance range in which the subject is located and the immediately preceeding distance range.

15. The lens focusing apparatus of claim 13 or 14 wherein said lens mounting means comprises a lens holding member disposed for rotation about a center axis and said objective lens arrangement comprises a plurality of lens elements on said lens holding member in circumferentially spaced apart relation with respect to each other about said center axis with each of said lens elements corresponding to a different one of said plurality of focal positions such that rotational displacement of said lens holding member about said center axis by said displacement means operates to sequentially move each of said lens elements into its said one focal position.

16. The lens focusing apparatus of claim 15 wherein said sonar ranging signal is transmitted simultaneously with an initiation of rotational displacement of said lens holding member by said displacing means.

17. The lens focusing apparatus of claim 16 wherein said plurality of spaced apart catches comprise a plurality of notches disposed in circumferentially spaced-apart relation about the outer periphery of said lens holding member and said catch engaging means comprises a lens pawl releasable for engagement against the outer periphery of said lens holding member in the space between a pair of adjacent notches such that a continued rotation of the lens holding member operates to thereafter move a respective one of said notches into position to receive said lens pawl and thereby stop the displacement of said lens holding member.

18. A camera having means for defining a focal plane, said camera comprising:
  means for generating and transmitting a sonar ranging signal and for providing an indication upon detection of an echo signal reflected from a photographic subject at an elapsed time subsequent to the transmission of the sonar ranging signal;
  an object lens arrangement;
  means for mounting said objective lens arrangement for displacement between a plurality of focal positions, said mounting means comprising a plurality of spaced apart catches corresponding respectively to said plurality of focal positions, said objective lens arrangement being adapted to focus an image of a subject located at a different distance from said camera within a given range of distances at the focal plane of said camera at each of its said focal positions;
  means for effecting a displacement of said objective lens so that said objective lens arrangement reaches each one of its said plurality of focal positions at a time correlated to an indication of an echo signal being provided from said sonic ranging means in an event that a subject is located from said camera at a distance at which said objective lens arrangement would focus an image thereof at the camera's focal plane; and means responsive to receipt of an echo signal from a subject by said sonar ranging means for stopping the displacement of said objective lens arrangement at the one focal position in which the objective lens arrangement would focus an image of the subject at the focal plane of the camera, said stopping means comprising means for engaging a respective one of said catches to stop the displacement of said objective lens arrangement and timing means for releasing said catch engaging means at an elapsed time subsequent to receipt of the echo sufficient to enable said catch engaging means to first engage said objective lens arrangement in the space between a pair of adjacent catches such that the continued displacement of said objective lens arrangement operates to thereafter move a respective one of said catches into engagement with said catch engaging means to stop the displacement of said objective lens arrangement at the appropriate focal position corresponding to the distance range in which the subject is located.

19. The automatic focusing apparatus of claim 18 wherein said stopping means also comprises a counter connected to count in correspondence with said sonar ranging signal and a plurality of logic circuits operatively connected with respect to said counter and said sonar ranging means to provide a catch engaging means release signal at an elapsed time subsequent to receipt of the echo signal sufficient to enable said catch engaging means to first engage said objective lens arrangement in the space between the pair of adjacent catches corresponding respectively to the focal positions for the distance range in which the subject is located and the immediately preceeding distance range.

20. The camera of claim 18 or 19 wherein said lens mounting means comprises a lens holding member disposed for rotation about a center axis and said objective lens arrangement comprises a plurality of lens elements on said lens holding member in circumferentially spaced apart relation with respect to each other about said center axis with each of said lens elements corresponding to a different one of said plurality of focal positions such that rotational displacement of said lens holding member about said center axis by said displacement means operates to sequentially move each of said lens elements into its said one focal position.

21. The camera of claim 20 wherein said sonar ranging signal is transmitted simultaneously with an initiation of rotational displacement of said lens holding member by said displacing means.

22. The camera of claim 21 wherein said plurality of spaced apart catches comprise a plurality of notches disposed in circumferentially spaced-apart relation about the outer periphery of said lens holding member and said catch engaging means comprises a lens pawl releasable for engagement against the outer periphery of said lens holding member in the space between a pair of adjacent notches such that the continued rotation of the lens holding member operates to thereafter move a respective one of said notches into position to receive said lens pawl and thereby stop the displacement of said lens holding member.

* * * * *